United States Patent [19]
Lev et al.

[11] Patent Number: 5,729,544
[45] Date of Patent: Mar. 17, 1998

[54] METHOD FOR TRANSMITTING DATA PACKETS BASED ON MESSAGE TYPE

[75] Inventors: Valy Lev; Rod Averbuch; Israel A. Cimet, all of Buffalo Grove, Ill.

[73] Assignee: Motorola, Inc., Schaumburg, Ill.

[21] Appl. No.: 239,656

[22] Filed: May 9, 1994

[51] Int. Cl.[6] .................................................. H04L 12/56
[52] U.S. Cl. ............................................ 370/352; 370/353
[58] Field of Search ........................ 370/60, 60.1, 94.1, 370/85.7, 95.3, 95.1, 85.2, 351, 352, 353, 354, 355–357, 360, 385, 387–389, 392, 395, 401, 467, 466, 465, 474; 455/39, 68, 53.1, 54.1, 54.2, 55.1, 56.1

[56] References Cited

U.S. PATENT DOCUMENTS

| | | | |
|---|---|---|---|
| 4,698,802 | 10/1987 | Goke et al. | 370/94.1 |
| 4,926,415 | 5/1990 | Tawara et al. | 370/85.2 |
| 4,926,416 | 5/1990 | Weik | 370/60.1 |
| 5,159,592 | 10/1992 | Perkins | 370/85.7 |
| 5,208,806 | 5/1993 | Hasegawa | 370/60.1 |
| 5,339,317 | 8/1994 | Tanaka et al. | 370/60.1 |

*Primary Examiner*—Dang Ton
*Attorney, Agent, or Firm*—Christopher P. Moreno

[57] ABSTRACT

Data to be transmitted from an information source (301), associated with a local/wide area network (303), to a target destination (317) is formatted into a plurality of data packets. Based on a message type of the data packets, either a circuit-switched network (311) or a packet-switched network (309) is selected. When the circuit-switched network is chosen, a circuit-switched channel (314) is established to the target destination, and the data packets are transmitted to the target destination via the circuit-switched channel. When the packet-switched network is chosen, a packet-switched channel (313) is established to the target destination, and the data packets are transmitted to the target destination via the packet-switched channel.

6 Claims, 2 Drawing Sheets

METHOD FOR TRANSMITTING DATA PACKETS BASED ON MESSAGE TYPE

FIELD OF THE INVENTION

The present invention relates generally to communication systems and, in particular, to the transmission of data packets.

BACKGROUND OF THE INVENTION

There exists today a growing need to expand the use of traditionally office-based computer applications (e.g., word processing programs, electronic mail, etc.) to remote locations such as the home or car. Data files and/or messages generated by such applications, residing on hosts having local-area network/wide-area network (LAN/WAN) connectivity, are typically transmitted from one location to another using high-speed protocols such as the so-called Transmission Control Protocol/Internet Protocol (TCP/IP). In order to extend the use of these applications to remote locations not serviced by a LAN/WAN, it is necessary to establish connections between LAN/WANs and other non-similar communication networks, such as wireless communication systems.

A major difficulty in connecting LAN/WANs to wireless communication systems is the large disparity in their available transmission bandwidths and hence, their throughput capacities. It is not atypical for a wireless communication system to have a transmission bandwidth 10 times less that of a LAN/WAN. This disparity also contributes to the widely differing protocols used in LAN/WANs and wireless communication systems. The lower throughput capacities associated with wireless communication systems has led to the use of circuit-switched techniques, whereas the higher throughput capacities associated with LAN/WANs has led to the use of packet-switched techniques.

FIG. 1 illustrates an example of a typical, prior art circuit-switched communication (100). When initial source data (101) becomes available, a channel set-up period (107) is required to establish a communication path between the source and the destination. For example, in the wireless case, the channel set-up period (107) may be the time required to request and obtain usage of a particular radio frequency (RF) carrier. Regardless of the channel type, the channel, once established, remains dedicated for the exclusive use of the source and destination.

Having established the channel, the initial source data is transmitted (109) to the destination. As additional source data (103, 105) becomes available, it is immediately transmitted (113, 117) through the channel. When necessary, usage of the channel is then discontinued during a channel tear-down period (119). Advantages of circuit-switched techniques are the low overhead requirement (i.e., the amount of throughput capacity required for the transmission of information other than the source data), as well as the low delay (i.e., the time difference between the availability of source data and its actual transmission). The periods of channel inactivity (111, 115) in between periods of data availability, however, are a disadvantage of circuit-switched techniques. This is a direct result of the dedicated use of the channel; other sources are unable to utilize the channel. These advantages and disadvantages make the use of circuit-switched techniques most efficient for longer communications, such as file transfers or fax transmissions.

FIG. 2 illustrates an example of a typical, prior art packet-switched communication (200). A key difference between packet-switched and circuit-switched methods is that the channel, when used in a packet-switched manner, is not dedicated and is available for use by multiple sources and destinations. Once available, the initial source data (101) is partitioned into data packets (203, 207, 211) for transmission. The data packets (203, 207, 211) occupy available time-slots that include capacity for overhead data (201, 205, 209). Due to the commonality of the channel, the overhead data (201, 205, 209) typically comprises target destination identification information so that data intended for a particular destination may be properly routed.

As additional source data (103, 105) becomes available, it is again formatted into data packets (217, 221, 227) and placed into available time-slots with their associated overhead data (215, 219, 225). Advantages of packet-switched methods are that set-up/tear-down periods are not required. Also, multiple communications may be intermingled on the channel. Assuming the use of channels having equivalent bandwidths, packet-switched methods are less efficient relative to circuit-switched methods due to the additional overhead, typically leading to larger throughput delays. Delays are further lengthened when time-slot availability is reduced due to heavy use of the channel. These disadvantages can be overcome by increasing the packet-switched channel's transmission bandwidth, if possible, to accommodate the larger overhead and need for additional time-slots. Typically, packet-switched techniques are most efficient in the transmission of shorter communications, such as electronic mail messages or paging services.

In order to establish connectivity between LAN/WANs and wireless communication systems, the incompatibilities of their respective packet-switched and circuit-switched protocols need to be resolved. One solution to this problem is to directly transmit the packet-switched data, including the overhead data for each packet, over a circuit-switched (i.e., wireless) channel. This is inadequate, however, because the differences in throughput capacities would require an inordinate amount of packet-switched information to be buffered prior to transmission over the circuit-switched channel. Even if the circuit-switched channel has sufficient bandwidth, this solution becomes inefficient due to channel inactivity during periods of low packet volumes.

Another solution is to establish a circuit-switched transmission for each data packet or group of data packets. While this solution might be acceptable for low volumes of packets, it becomes severely inefficient for increasing packet volumes due to the set-up and tear-down overhead.

As the previous examples indicate, the efficiency with which packet-switched data is transmitted depends on the type of message being transmitted. That is, shorter packet-switched messages may be efficiently transmitted over packet-switched channels, whereas longer packet-switched messages may be efficiently transmitted over circuit-switched channels. Therefore, a need exists for a method that allows packet-switched data to be transmitted in the most efficient manner.

DESCRIPTION OF A PREFERRED EMBODIMENT

Generally, the present invention provides a method for transmitting information of a given message type to a target destination. This is accomplished by formatting the data to be transmitted into a plurality of data packets. Based on a corresponding message type of the data packets, either a circuit-switched network or a packet-switched network is selected. When the circuit-switched network is chosen, a circuit-switched channel is established to the target destination, and the data packets are transmitted to the target destination via the circuit-switched channel. When the packet-switched network is chosen, a packet-switched channel is established to the target destination, and the data packets are transmitted to the target destination via the packet-switched channel. Such a method allows packet-switched information to be transmitted in the most efficient manner to a target destination.

Figure 1:
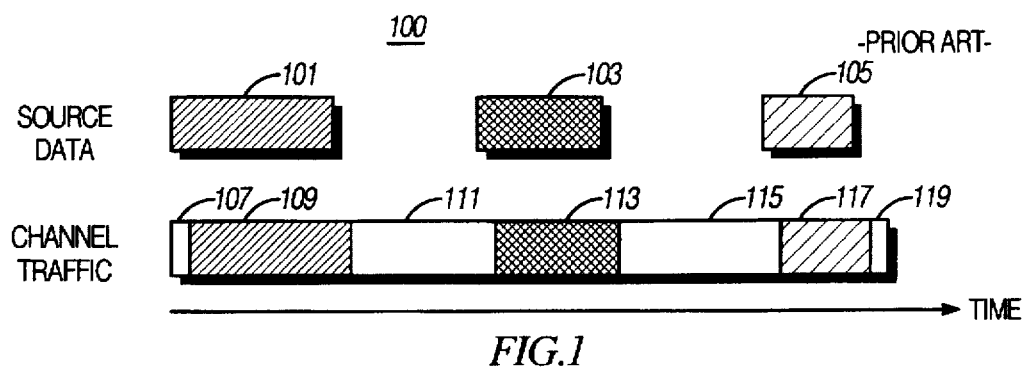
FIG. 1 illustrates a circuit-switched communication in accordance with prior art.
Figure 2:
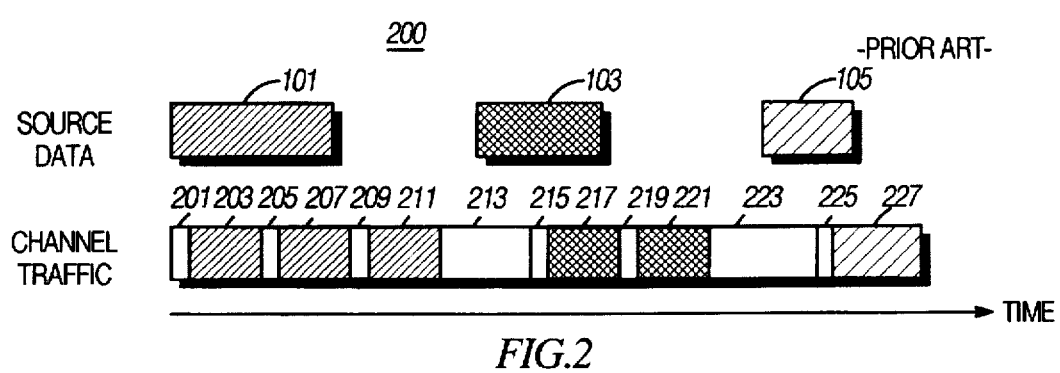
FIG. 2 illustrates a packet-switched communication in accordance with prior art.
Figure 3:
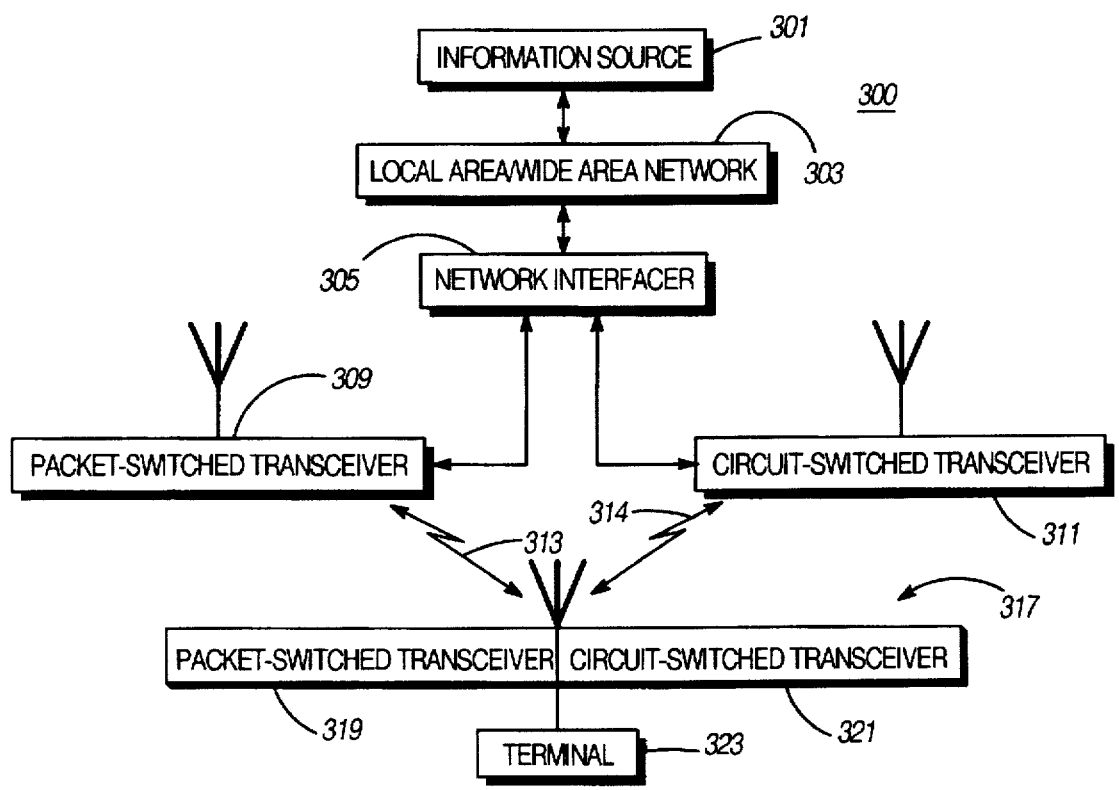
FIG. 3 illustrates a data network that includes a local/wide-area network and a wireless communication system in accordance with the present invention.

The present invention can be more fully described with reference to FIGS. 3 and 4. FIG. 3 illustrates a data network (300) that includes an information source (301), a local/wide area network (LAN/WAN) (303), a network interfacer (305), a packet-switched transceiver, (309), a circuit-switched transceiver (311), a packet-switched channel (313), a circuit-switched channel (314), and a target destination (317). The information source (301) may comprise an electronic mail or word processing application running on a personal computer (PC) or workstation. The LAN/WAN (303) may comprise a public or private data network such as Integrated Services Digital Network (ISDN), Frame Relay, or Asynchronous Transfer Mode (ATM) network.

The network interfacer (305) provides a link between the LAN/WAN (303) and an RF communication system comprising the packet-switched transceiver (309), the circuit-switched transceiver (311), the packet-switched channel (313), the circuit-switched channel (314), and the target destination (317). The network interfacer (305) may be a group of modems providing multiple access paths to the public switched telephone network (PSTN), or it may be a packet gateway/router that incorporates many different protocols to communicate with public or private data networks.

The packet-switched transceiver (309) comprises a transmitter/receiver pair capable of communicating in a packet-switched manner, as described previously. Likewise, the circuit-switched transceiver (311) comprises a transmitter/receiver pair capable of communicating in a circuit-switched manner, as described previously. Management of each transceiver's (309, 311) respective channel (313, 314) (i.e., handoffs, channel assignment, etc.) can be done by the transceivers (309, 311) themselves, or jointly with the network interfacer (305). Additional data manipulation, such as error correction, may also be performed by the transceivers (309, 311) and/or the network interfacer (305).

The target destination (317) further comprises a mobile packet-switched transceiver (319) and a mobile circuit-switched transceiver (321) coupled to a data-capable terminal (323). The mobile circuit-switched transceiver (321) may comprise a Groupe Speciale Mobile (GSM) digital cellular telephone or a IDEN™ mobile radio, both by Motorola, Inc. The packet-switched transceiver (319) may comprise an ARDIS® mobile radio by Motorola, Inc. The packet-switched transceiver (319) and the mobile circuit-switched transceiver (321) transceive information via the packet-switched channel (313) and the circuit-switched channel (314), respectively. The mobile transceivers (319, 321) transparently provide data to, and receive data from, the data-capable terminal (323). That is, data packets are exchanged with the data-capable terminal (323) as though it were directly coupled to the LAN/WAN (303). The data-capable terminal (323), which may be a PC-based facsimile unit for example, controls the reception and transmission of information based on the information type.

So configured, the information source (301) can send packet-switched data intended for the target destination (317), via the LAN/WAN (303), to the network interfacer (305). The network interfacer (305), in turn, can select either the packet-switched transceiver (309) or the circuit-switched transceiver (311) to transmit the data to the target destination (317).

Figure 4:
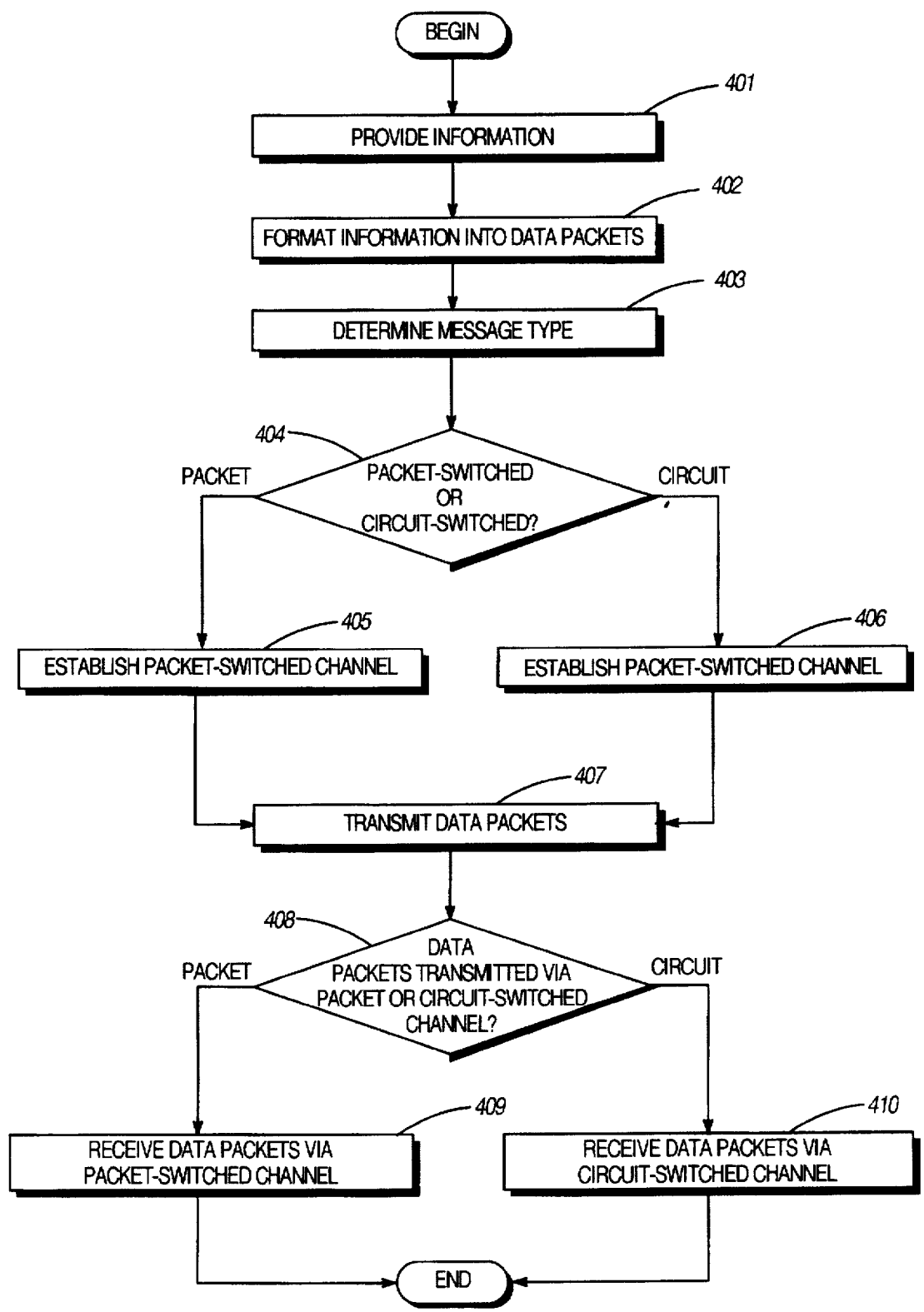
FIG. 4 illustrates a logic diagram which may be used by a data network when transmitting packet-switched and/or circuit switched information in accordance with the present invention.

FIG. 4 illustrates a logic diagram which may be used when transmitting information between the information source (301) and the target destination (317) in accordance with the present invention. The information transfer illustrated in FIG. 4 is hereinafter described in the context of an application using the TCP/IP protocol in a simplex manner (i.e., in one direction only). However, it is important to note that the process illustrated in FIG. 4 may also work for other protocols, such as the AppleTalk Transaction protocol, operating in a duplex manner, i.e., from the information source (301) to the target destination (317), and vice versa.

At step 401, it is assumed that information, intended for transmission to the target destination (323), is provided by an application operating at the information source (301). This information is in a digital form and may comprise a short electronic mail message or a long document file. The information source (301) formats the information into data packets (402). Each data packet includes a header that comprises a first target destination identifier, such as the IP address, for uniquely identifying the data-capable terminal (327). A TCP session header, including data fields for indicating a message type, is provided in addition to the data packets.

When initiating the TCP session, the message type is determined by the application sourcing the information and is indicated in the TCP session header. By examining the appropriate portion of the TCP session header (i.e., the TCP port number), the network interfacer (305) determines the message type (403). The preferred classification of all possible message types can be predetermined and stored in the network interfacer (305). If the message is a short type, such as electronic mail, the packet-switched network (i.e., the packet-switched transceiver) is selected (404). The packet-switched channel (313) is established (405) in the sense that the data packets are placed into the shared, packet-switched channel (313) as time slots become available.

Conversely, if the message is a long type, such as a file transfer, the circuit-switched network (i.e., the circuit-switched transceiver) is selected (404). Using conventional call set-up techniques, the network interfacer (305) establishes (406) the circuit-switched channel (314) to the target destination (317). For example, an identification number of the mobile circuit-switched transceiver (321), uniquely associated with the IP address of the data-capable terminal (323), may be used to establish the exclusive, circuit-switched channel (314). It is understood that availability of both the packet-switched and circuit-switched channels (313, 314) may also be considered when selecting the proper path.

Having established either a packet-switched or circuit-switched channel (313, 314), the data packets are transmitted to the target destination at step 407. When the packet-switched channel (313) is used, the data packets may be transmitted in their entirety, i.e., the headers for each data packet are transmitted. In a preferred embodiment, when the circuit-switched channel (314) is used, the header portion of each data packet is not transmitted, with the exception of the first data packet. (The interested reader will find additional details regarding a way to transmit packets through a circuit-switched channel in U.S. Pat. No. 5,483,524 entitled METHOD FOR TRANSMITTING DATA PACKETS VIA A CIRCUIT-SWITCHED CHANNEL, filed on even date herewith and being commonly assigned, which patent is incorporated herein by this reference.) Other methods of transmitting packet-switched data via a circuit-switched channel may be used without departing from the spirit of the present invention.

Upon transmission of the data (407), it is determined at the target destination (317) whether the data is being transmitted via the packet-switched or circuit-switched channel (408). When the packet-switched channel (313) is being used, this determination is done by examining the header portion of incoming time slots to detect the presence of data packets addressed to the target destination (317). When transmitted via the circuit-switched channel (314), the actual establishment of the circuit-switched channel (314) can be used to indicate the impending arrival of data.

When transmitted via the packet-switched channel (313), the data packets, including their respective TCP/IP headers, are received (409) and forwarded to the data-capable terminal (323). When transmitted via the circuit-switched channel (314), the data packets are received (410) and forwarded to the data-capable terminal (323) after having appropriate TCP/IP headers added to each data packet. In this manner, the method of actual transmission of the data packets is transparent to the data-capable terminal.

The present invention provides a method for transmitting information of a given message type to a target destination. With such a method, the inefficiencies inherent to the transmission of variable-length, packet-switched data are overcome. This is achieved through the provision of both packet-switched and circuit-switched communication paths. Based on the message type, the optimal path can be selected, thereby improving efficiency.

We claim:

1. A method comprising the steps of:
providing information to be transmitted, which information comprises one message type of a plurality of message types as indicated by a TCP session header included in the information;
formatting the information into a plurality of data packets;
automatically selecting as between a circuit switched network and a packet switched network based on the one message type indicated by the TCP session header, wherein the circuit switched network is selected when a long type is indicated by the one message type, and wherein the packet switched network is selected when a short type is indicated by the one message type;
when the circuit switched network is selected, establishing a circuit switched channel and transmitting the plurality of data packets via the circuit switched channel;
when the packet switched network is selected, establishing a packet switched channel and transmitting the plurality of data packets via the packet switched channel.

2. The method of claim 1 wherein the step of establishing the circuit switched channel includes the step of establishing an RF-based communication channel as the circuit switched channel.

3. The method of claim 1 wherein the step of establishing the packet switched channel includes the step of establishing an RF-based communication channel as the packet switched channel.

4. A method for communicating information between a source and at least one destination, the method comprising the steps of:
at the source;
providing information to be transmitted, which information comprises one message type of a plurality of message types as indicated by a TOP session header included in the information;
formatting the information into a plurality of data packets;
automatically selecting as between a circuit switched network and a packet switched network based on the one message type indicated by the TCP session header, wherein the circuit switched network is selected when a long type is indicated by the one message type, and wherein the packet switched network is selected when a short type is indicated by the one message type;
when the circuit switched network is selected, establishing a circuit switched channel and transmitting the plurality of data packets via the circuit switched channel;
when the packet switched network is selected, establishing a packet switched channel and transmitting the plurality of data packets via the packet switched channel;
at the at least one destination;
determining that the plurality of data packets is being transmitted as between the circuit switched network and the packet switched network;
when the plurality of data packets is transmitted over the circuit switched network, receiving the plurality of data packets via the circuit switched channel; and
when the plurality of data packets is transmitted over the packet switched network, receiving the plurality of data packets via the packet switched channel.

5. The method of claim 4 wherein the step of establishing the circuit switched channel includes the step of establishing an RF-based communication channel as the circuit switched channel.

6. The method of claim 4 wherein the step of establishing the packet switched channel includes the step of establishing an RF-based communication channel as the packet switched channel.

* * * * *

UNITED STATES PATENT AND TRADEMARK OFFICE
CERTIFICATE OF CORRECTION

PATENT NO. : 5,729,544
DATED : March 17, 1998
INVENTOR(S) : Lev et al.

It is certified that error appears in the above-indentified patent and that said Letters Patent is hereby corrected as shown below:

Column 6, line 19 reads "TOP" should be --TCP--.

Signed and Sealed this

Eleventh Day of August 1998

Attest:

BRUCE LEHMAN

Attesting Officer     Commissioner of Patents and Trademarks